United States Patent [19]

Janeway

[11] 4,215,276
[45] Jul. 29, 1980

[54] REMOTE CONTROL OF ELECTRICAL POWER DISTRIBUTION SYSTEM AND METHOD

[76] Inventor: William F. Janeway, 427 Webster St., Palo Alto, Calif. 94301

[21] Appl. No.: 888,302

[22] Filed: Mar. 20, 1978

[51] Int. Cl.² ............................ H02J 3/00; H04Q 9/00
[52] U.S. Cl. ..................................... 307/40; 307/115; 340/168 R; 340/163; 340/147 SY; 361/191
[58] Field of Search ............... 307/40, 39, 42, 115, 307/241, 242, 10 R; 340/147 C, 147 PC, 168 R, 163, 147 SY; 361/189–191

[56] References Cited

U.S. PATENT DOCUMENTS

| | | | |
|---|---|---|---|
| 3,558,902 | 1/1971 | Casey | 307/114 |
| 3,648,057 | 3/1972 | Sognefest | 307/10 R |
| 3,946,362 | 3/1976 | Sumida | 340/147 PC |
| 3,965,366 | 6/1976 | Sumida | 340/147 C |

Primary Examiner—L. T. Hix
Assistant Examiner—S. D. Schreyer

Attorney, Agent, or Firm—Flehr, Hohbach, Test

[57] ABSTRACT

The remote control of electrical power through a number of outlets at selected locations in the walls and ceiling of a building structure is disclosed herein. This is accomplished by applying the electrical power from a source through the walls and ceiling of a building structure to the selected locations. At the same time a clock signal of predetermined frequency and amplitude is generated and carried by a cable to a number of encoders which are located at respective control stations remote from the outlets and also to a number of decoders which are located at and associated with the various outlets. Each of these encoders, when actuated, generates a distinct code signal which is carried to all of the decoders on a common line and in synchronism with the clock signal which is provided for coordinating operation of the encoders and decoders. A preselected one of the decoders responds to this coded signal and accompanying clock signal for automatically applying the electrical power to its associated outlet.

22 Claims, 18 Drawing Figures

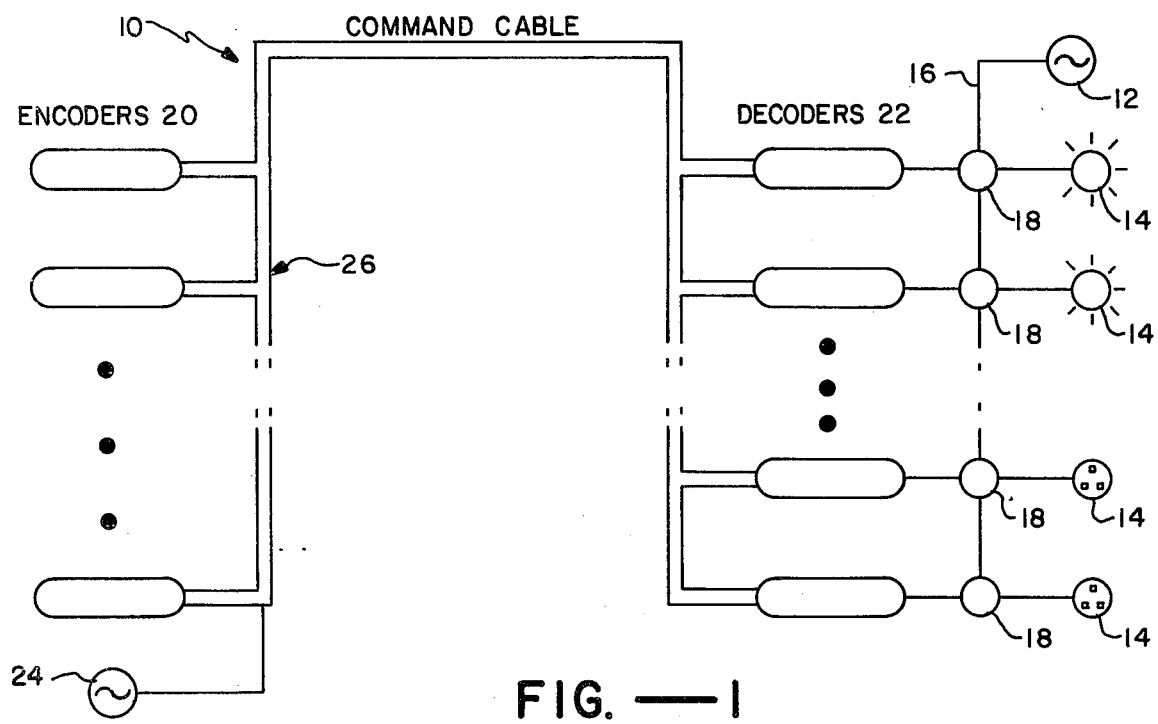
FIG.—1
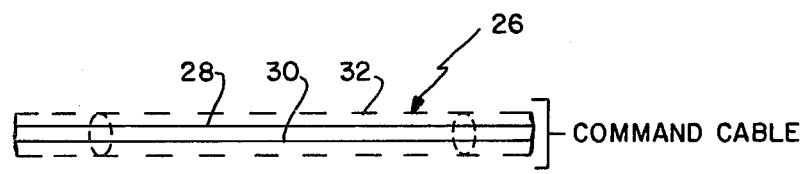
FIG.—2
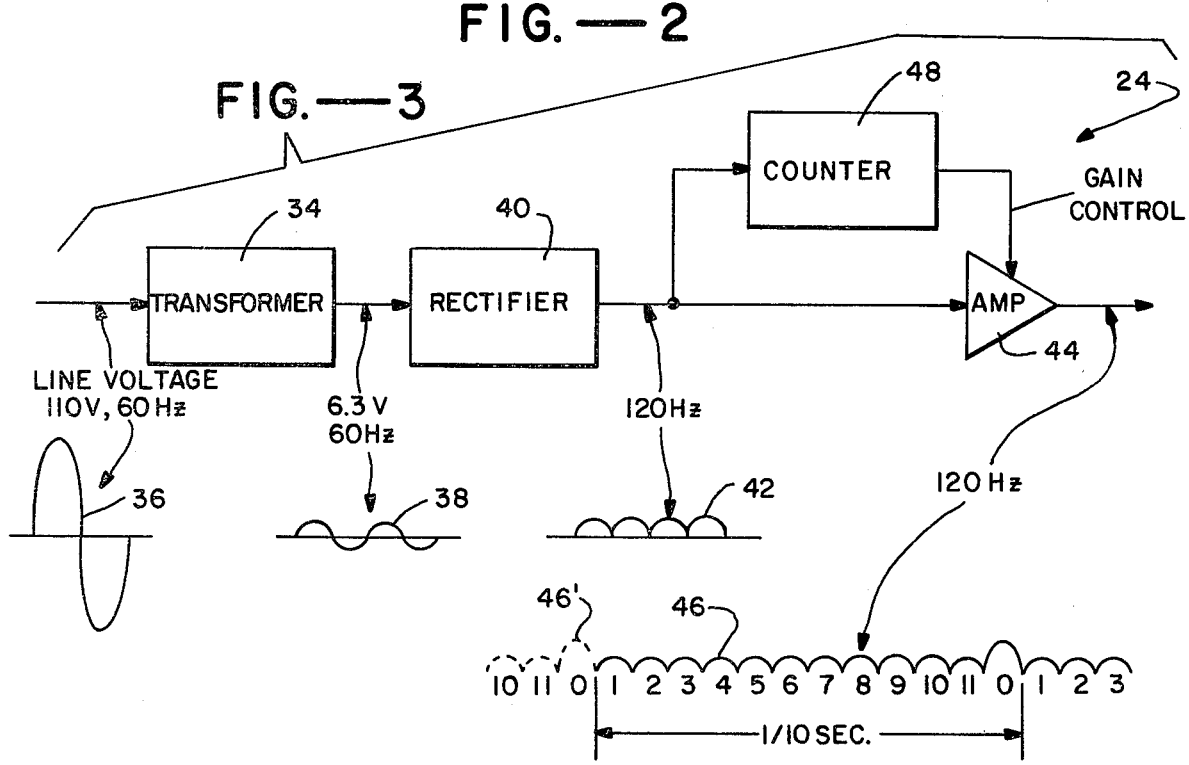
FIG.—3

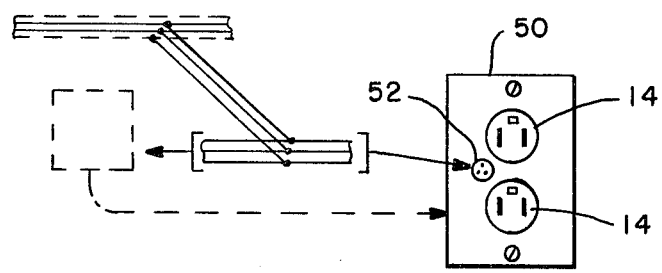
FIG.—4
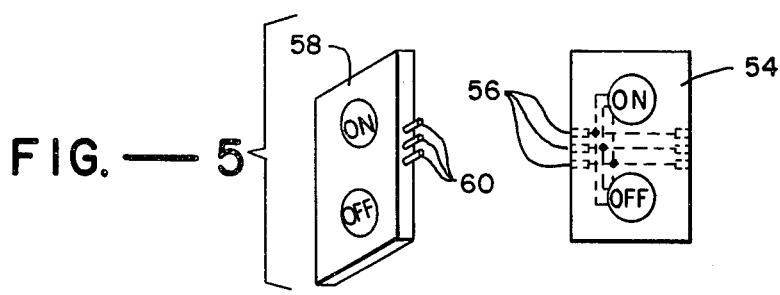
FIG.—5
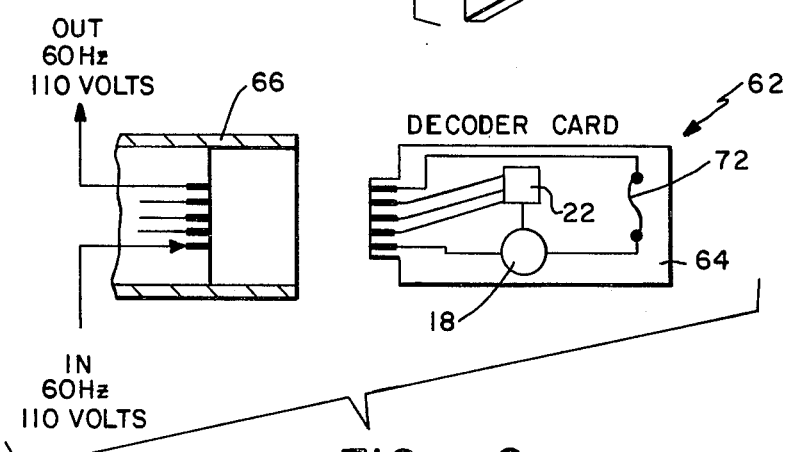
FIG.—6
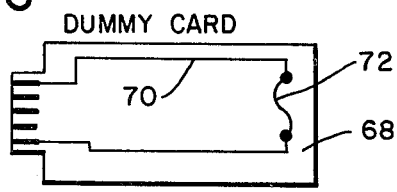
FIG.—7
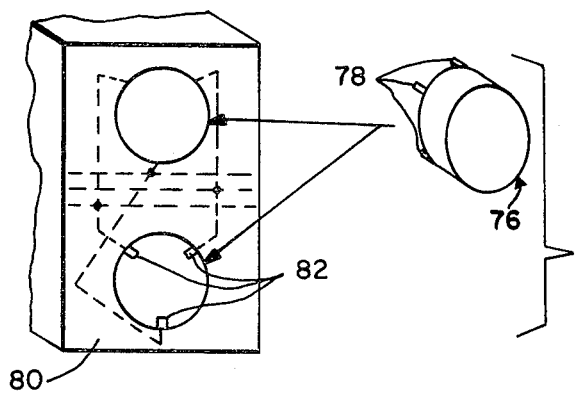
FIG.—8

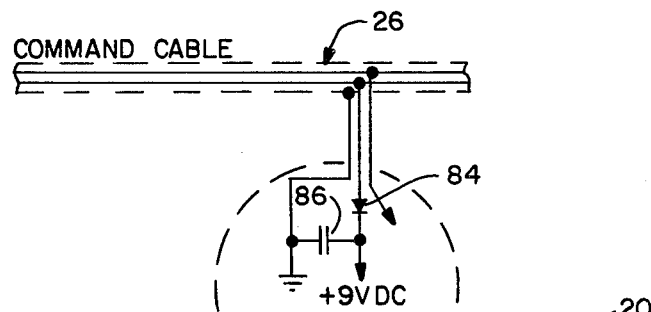
FIG.—9
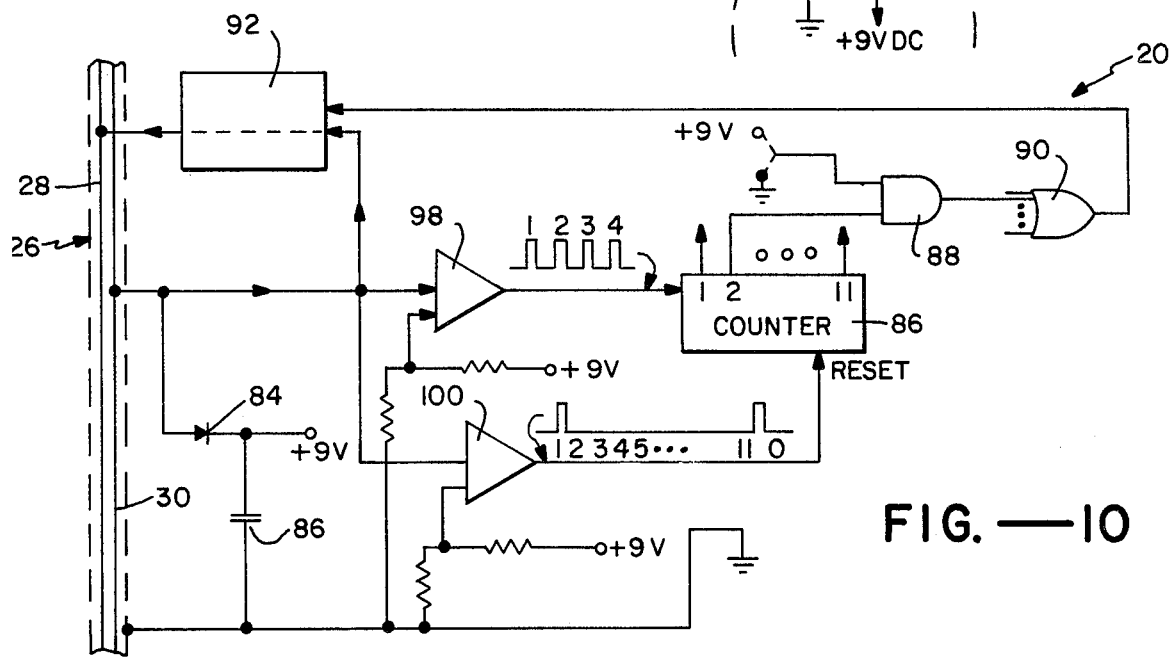
FIG.—10
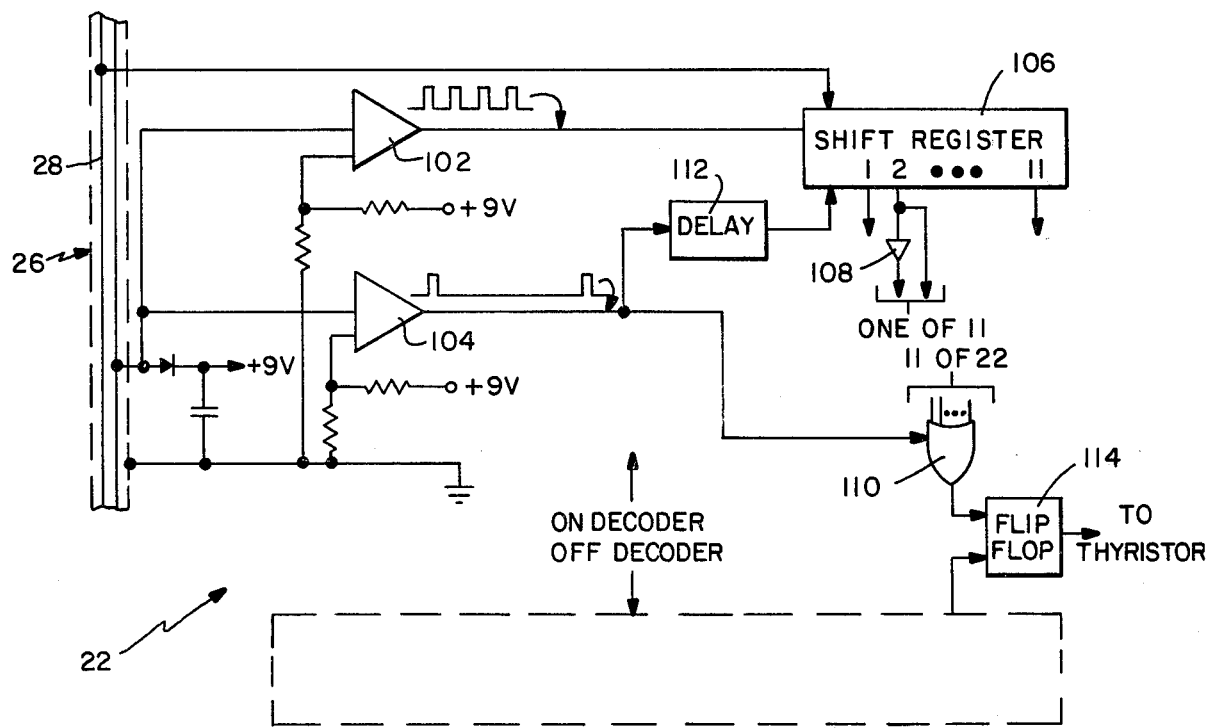
FIG.—11

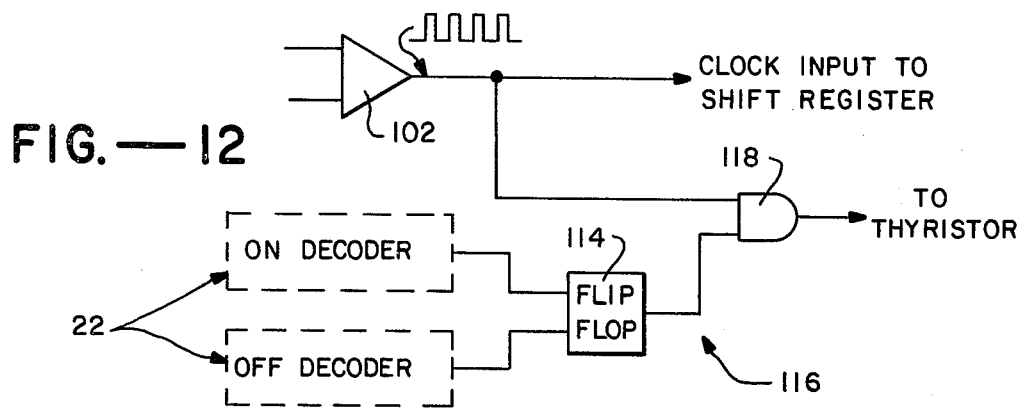
FIG.—12
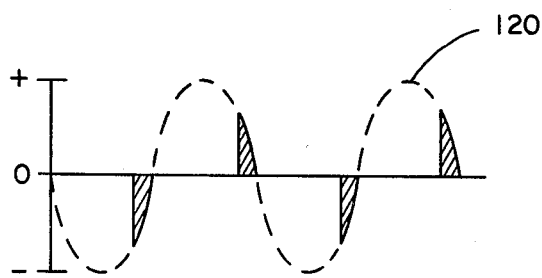
FIG.—13
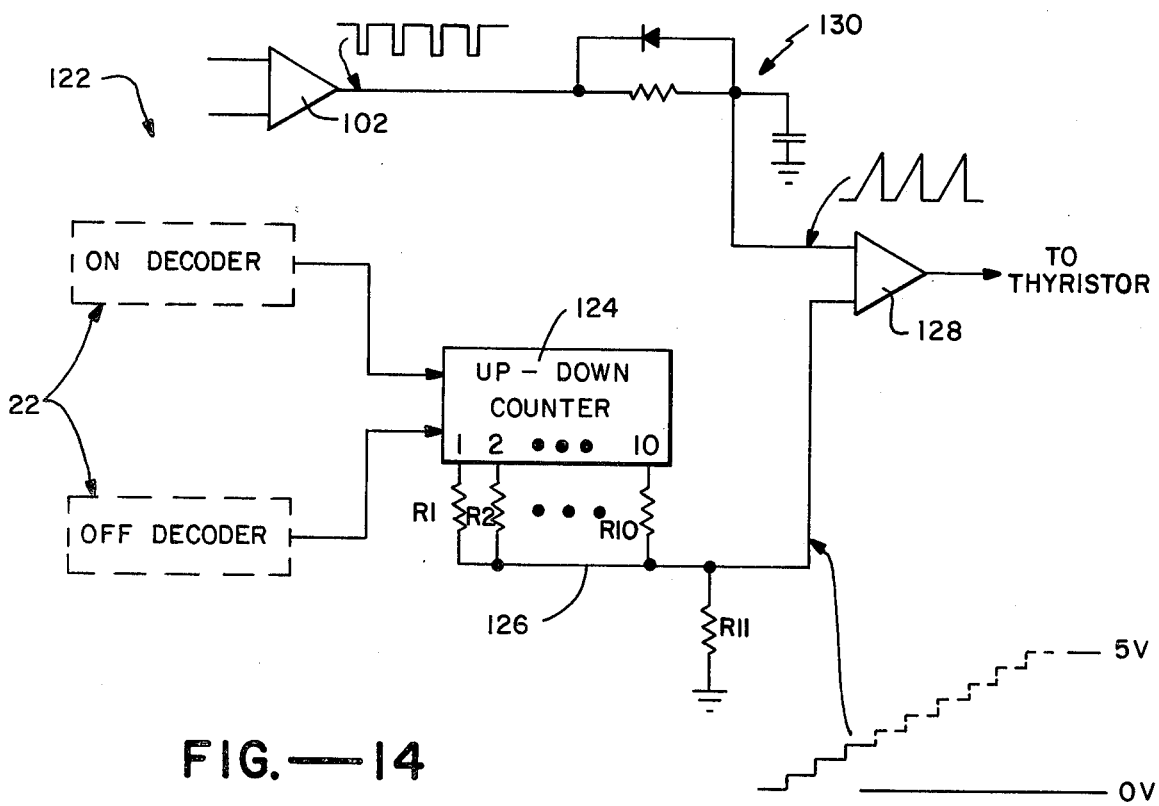
FIG.—14

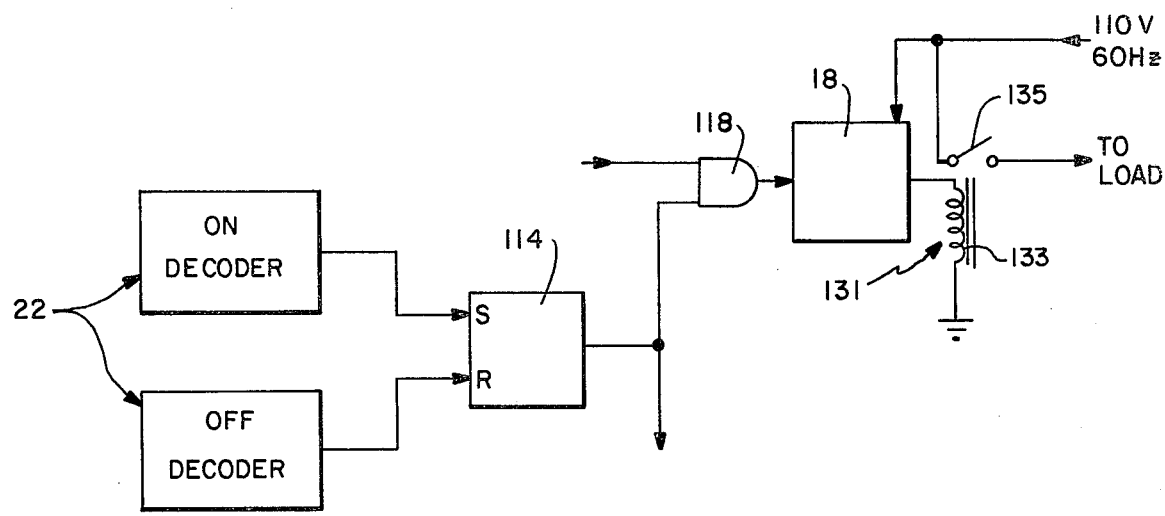
FIG.—15a
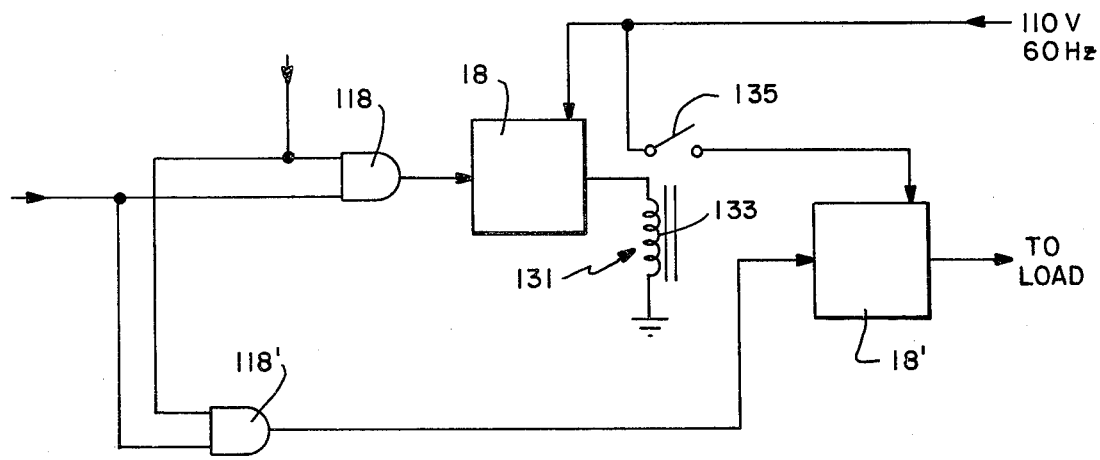
FIG.—15b

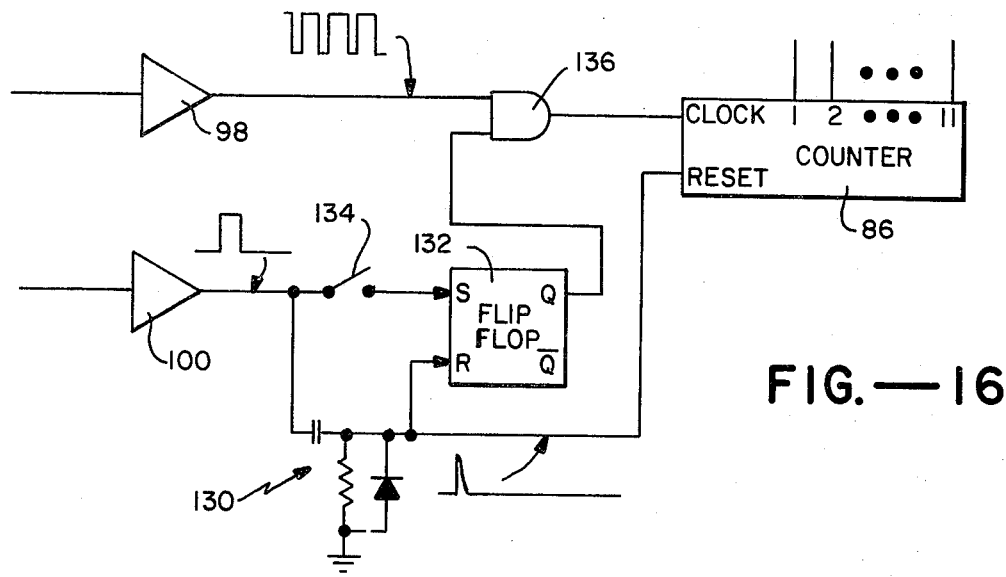
FIG.—16
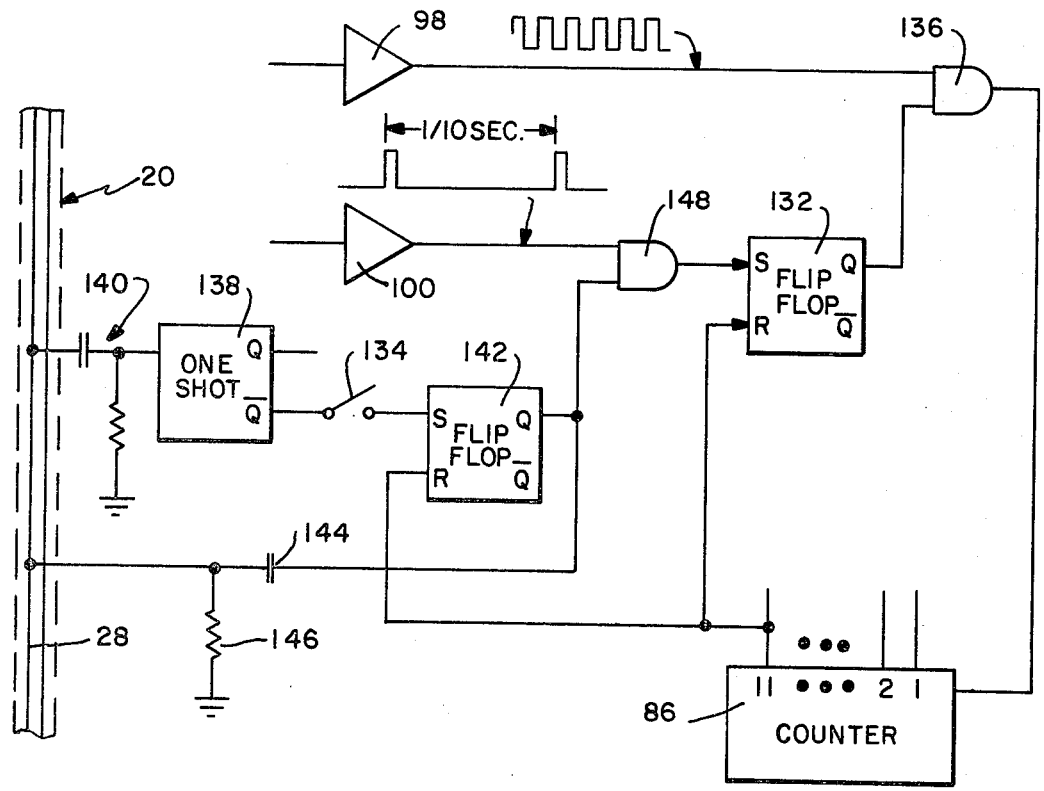
FIG.—17

REMOTE CONTROL OF ELECTRICAL POWER DISTRIBUTION SYSTEM AND METHOD

BACKGROUND OF THE INVENTION

The present invention relates generally to electrical power distribution systems and more particularly to a specific system for and method of controlling the supply of electrical power to a plurality of outlets located at selected locations in the walls and ceilings of a building structure from control stations disposed at remote locations in the walls of the building structure.

Today, an electrical power distribution system typically found in a building structure utilizes copper wiring of sufficient size to connect the various electrical outlets within the structure to a central source of power. Generally, building codes require that this wiring be protected by enclosing it in metal conduit. Any particular outlet which is to be remote controlled, for example from a wall mounted switch, requires that the same copper wiring and conduit must be run to the wall plate. This switch is typically a mechanical device which opens and closes contacts to control the flow of current from the power source to the outlets.

There are a number of deficiencies with an electrical power distribution system of the type just described. For example, this type of system is quite inflexible. Wiring connections are permanent and impractical to change after construction. While it would often be desirable to change connections, for example, when furniture is moved or when a particular room is remodeled, or put to some different use, this is seldom practical since it involves pulling wires out of their associated conduits and inserting new wires, and often cutting into walls or floors to install new conduit.

In addition to this inconvenience and inflexibility, the extra wiring required to carry power to and through the various switching stations in a system of the type described above adds substantial cost to the overall installation, as much as 30 to 50 percent in a typical dwelling. Moreover, there is a certain element of danger in having the full power voltage close to the operator. In addition, these mechanical switches are subject to wear and tear; and the power supplied through the switches, typically 110 volt AC power at 60 Hz frequency, when applied or cut off by the switches at random times, results in harsh treatment to some appliances. For example, if contact closure occurs at the peak value of the voltage, a cold lamp filament receives a severe excess of current and may burn out just as the switch is closed.

The various deficiencies just recited, along with others have led to distribution systems which do not route the power wiring to the wall mounted switches. These systems utilize signalling devices at the remote control stations for sending messages to the various outlets over circuits which are separate from the power wiring. Power switching may be accomplished at these outlets or at a central location where several outlets are controlled by means of electromechanical relays. Another method which has been suggested is to send a coded sequence of pulses (or specific frequencies) to electronic circuits at the various outlets.

As will be seen hereinafter, the present invention relates to an electrical power distribution system of this latter type. In this regard, applicant has found there to be a similarity between the control functions required in a system of this type for use in a building structure and the control functions employed in modern computers and communication systems. More specifically, the computers and communications systems of today include highly developed functions including digital coding of messages, multiplex signaling, that is, sending several messages over a single line, and the use of solid state integrated circuitry for reliable and inexpensive signal processing. As will be seen hereinafter, applicant has found a way to apply this technology to electrical power distribution systems with the result being superior performance and reduced cost.

In a computer, a great deal of information is circulated among the various components. Typically, this information is coded in binary form. Also, there is generally a definite format for allowable messages. For example, each message may consist of a fixed number of pulses which are either present or absent and which run in sequence at a fixed rate, specifically at a "clock" frequency. A suitable oscillator may generate this "clock" frequency or "clock" signal as it is called and all parts of the computer are kept in synchronism by receiving this signal. Both data and instructions for processing such data circulate on buses, which are conductors interconnecting several sections of the computer. A great many messages can travel on a single bus provided they occur at different times. Messages, such as for example the closure of a certain key on a keyboard, are turned into suitable sequences of pulses by encoders. A typical encoder is an electronic circuit which generates a characteristic string of pulses when actuated by a suitable input. Coded messages are made effective at the receiving end by decoders. A typical decoder is an electronic circuit capable of responding to a particular sequence of pulses, that is, to a particular message, causing the decoder to produce an output signal, for example a change of voltage at its output. This signal indicates that the particular message has been received. A great many other messages from other encoders might flow over the same bus without any effect on the specific decoder, which responds only to one specific message. As will be seen hereinafter, applicant has found these various techniques useful for providing an economical and yet reliable electrical power distribution system for controlling the supply of electrical power to a plurality of outlets located at selected locations in the walls and ceilings of a building structure.

OBJECTS AND SUMMARY OF THE INVENTION

One object of the present invention is to provide an electrical power distribution system for controlling the supply of electrical power to a plurality of outlets located at selected locations in the walls and ceilings of a building structure from remote control stations without applying the power to and through these control stations.

Another object of the present invention is to provide an electrical power distribution system which is uncomplicated in design, economical to provide, and reliable in use.

Still another object of the present invention is to provide a system which uses to its advantage a number of the techniques typically found in modern computers and communication systems.

Yet another object of the present invention is to provide a flexible system which can be readily modified for a particular intended use.

Still another object of the present invention is to provide a system which takes advantage of modern electronic technology, specifically in the area of integrated circuits and other such miniaturized electronic technology.

Yet another object of the present invention is to provide a system which minimizes power consumption used for control purposes.

Still another object of the present invention is to provide a system for controlling the supply of electrical power to its various outlets in a way which minimizes damage to certain appliances, for example light bulbs, powered from these outlets and also in a way which controls the precise amount of power applied to these outlets at a given time.

A further object of the present invention is to provide a method of controlling the supply of electrical power to a plurality of outlets utilizing the system recited and the objects attributed thereto.

As will be seen hereinafter, the electrical power distribution system constructed in accordance with the present invention includes power conductors extending from a source of electrical power to selected locations for providing electrical power to outlets located thereat through for example the walls and ceiling and even the floors of the building structure. A switching device disposed at each of these locations responds to a predetermined switching signal for connecting the power conductor at its station to an associated outlet, for applying the electrical power thereto. A plurality of control stations are disposed at selected remote locations in the walls of the building structure and each includes an encoder which, when actuated, generates a distinct coded signal. A decoder is located at each of the various outlets where it is connected to an associated switching device. Each decoder responds to a corresponding coded signal from one of the encoders for integrating the foresighted switching signal to connected switching device for applying electrical power to its associated outlet.

In accordance with one aspect of the present invention, this electrical power distribution system includes means for producing a continuous pulsating clock signal of predetermined frequency and amplitude for synchronizing and coordinating the operation of the various encoders and decoders. A common control cable extends through the walls and ceiling of the building structure between the control stations and outlets. This cable includes a command conductor connected between all of the encoders and decoders for carrying the coded signals from any of the encoders to all of the decoders. The cable also includes a clock conductor connected to the clock signal producing means, and to all of the encoders and decoders, for carrying the clock signal to all of the encoders and decoders in synchronism with the coded signals.

The control cable might include additional conductors. For example, a separate conductor might be used for carrying DC power to the encoders and decoders in the system. Also, a separate conductor might be used for "housekeeping" functions, such as carrying signals other than switching commands, as might be useful in coordinating encoders, so as to avoid conflicting messages on the command conductor. In the particular embodiment of the invention described here a cable with two conductors and shield is preferred.

In the system just recited, the source of electrical power will most likely be that typically provided to a residential or commercial structure, that is, 110 volts AC, at a frequency of 60 Hz. In one embodiment of the present invention, as will be seen, this line power is utilized to produce a rectified, low voltage pulsating clock signal having the same frequency as the line power or a multiple thereof. As will also be seen, this clock signal may be utilized for powering the previously recited encoders and decoders. Moreover, each of the encoders may utilize the clock signal directly for producing its coded signal by means of appropriate gating circuitry.

In accordance with still other aspects of the present invention, the system disclosed herein provides for auxiliary encoders and decoders which may be readily plugged into electrical communication with the common control cable, that is, with the common command conductor (coded signals) and clock conductor (clock signal) at the various control stations and outlet stations respectively. By providing several different encoders and associated decoders, the overall system can be readily modified for a particular use without affecting the internal wiring of the overall system.

Other aspects of the present invention will become apparent hereinafter as the overall system is discussed in more detail.

BRIEF DESCRIPTION OF THE DRAWINGS

FIG. 1 is a schematic illustration of an electrical power distribution system which is provided for use in a building structure, specifically a residential or commercial structure, and which is constructed in accordance with the present invention.

FIG. 2 is a schematic illustration of a common control cable utilized in the system illustrated in FIG. 1.

FIG. 3 is a block diagram of a circuit which may be utilized by the system illustrated in FIG. 1 for generating a clock signal to be used by the system.

FIG. 4 is a schematic illustration showing the way in which an auxiliary decoder can be readily connected into the distribution system at a particular outlet.

FIG. 5 is a schematic illustration showing how an auxiliary encoder can be readily connected into the system.

FIG. 6 is a schematic illustration of a decoder and associated components which may comprise part of the distribution system and which may be provided in the form of integrated circuits on a readily removable printed circuit board.

FIG. 7 is a schematic illustration of a printed circuit board of the type illustrated in FIG. 6 and without the decoder and some of its associated components.

FIG. 8 is an exploded perspective view schematically illustrating an encoder mounting plate and readily removable encoder which may comprise part of the distribution system.

FIG. 9 is a schematic illustration of a circuit which utilizes the clock signal of the distribution system to power the various encoders and decoders also comprising part of the system.

FIG. 10 is a schematic illustration of an encoder which includes gating circuitry for producing a coded signal from the clock signal.

FIG. 11 is a schematic illustration of a circuit comprising part of a decoder which is utilized in the distribution system.

FIG. 12 is a schematic illustration of a circuit which utilizes the clock signal to control the precise time at which power is applied to the various outlets.

FIG. 13 is a schematic illustration of a sinusoidal current which might flow through the load at the outlet.

FIG. 14 is a schematic illustration of a circuit which may be utilized to adjust the power at a particular outlet.

FIGS. 15a and 15b illustrate two particular ways in which the decoder circuitry may be connected to a load.

FIG. 16 schematically illustrates the circuitry for a modified encoder.

FIG. 17 schematically illustrates the circuitry for still a further modification of the encoder.

DETAILED DESCRIPTION OF THE EMBODIMENT

Turning now to the drawings, wherein like components are designated by like reference numerals throughout the various figures, attention is specifically directed to FIG. 1 which illustrates an electrical power distribution system constructed in accordance with the present invention and generally designated by the reference numeral 10. This system is provided for controlling the supply of electrical power from a source generally designated at 12 to a plurality of outlets 14 located at selected locations in the walls and ceiling of a building structure which, for purposes of clarity, has not been shown. As illustrated in FIG. 1, these outlets may be in the form of luminares and conventional electrical receptacles adapted to receive electrical appliances or the like. Power source 12 is typically 110 volt AC power at 60 Hz frequency which is readily available to most residential and commercial structures. However, it should be understood that the present invention is not limited to this particular form of electricity.

Electrical power distribution system 10 includes one or more power conductors 16 which extend from source 12 through the walls and ceiling of the building structure to selected locations, specifically the locations including outlets 14 for providing electrical power to these outlets. A switching device 18 is disposed at least at several of these locations and is responsive to a predetermined switching signal for connecting the power conductor at its station to an associated outlet for applying the electrical power thereto. An encoder 20 is located at each of a number or remote control stations disposed at selected locations in the walls of the building structure. Each of these encoders, when actuated, generates a distinct code signal which is different from all other code signals. Decoders 22 are located at the various outlets 14 and are connected to associated switching devices 18. Each of these decoders is responsive to a corresponding code signal from a particular encoder 20, generating the switching signal to its connected switching device which, in turn, automatically connects the power conductor 16 to its associated outlet, as previously stated.

In accordance with one aspect of the present invention, system 10 also includes a generator generally designated at 24 for producing a continuous clock signal (a series of pulses) having a predetermined frequency and amplitude for synchronizing and coordinating the operation of encoders 20 and decoders 22. While this clock signal producing generator may be comprised of conventional oscillator circuitry for producing the signal in and by itself, as will be seen hereinafter, it preferably utilizes the already available voltage source 12 for producing its clock signal.

The various encoders are interconnected by means of a common control cable 26 which extends through the walls and ceiling of the building structure between the control stations and the outlets. This cable includes a command conductor connected between all of the encoders and decoders for carrying the previously recited coded signals from each of the encoders to all the decoders. The cable also includes a clock conductor connected to the clock signal circuitry 24 and to all of the encoders and decoders for carrying the clock signal from the generator 24 to all of the encoders and decoders in synchronism with the coded signals. For convenience and for mechanical protection of these conductors, they may be surrounded by a woven-wire shielding, thus making a common type of electrical cable known as a shielded pair. This cable is illustrated in FIG. 2 and includes the command conductor indicated at 28, the clock conductor indicated at 30, and the shield indicated by the dotted lines at 32.

As stated previously, the 60 Hz power supply 12 may serve to produce previously recited clock signal even though this source is a high voltage source having a sinusoidal wave form and the clock signal is to be a pulsating low frequency signal. It will be seen this conversion can be readily made by the utilization of a step-down transformer and a full-wave rectifier. This is best seen in FIG. 3 which illustrates the necessary circuitry making up the source 24 for producing the clock signal in this way. As seen in FIG. 3, source 24 includes a conventional step-down transformer 34 which receives line voltage, that is, voltage from source 12 at its input. As illustrated by signal 36, this line voltage is 110 volts in amplitude RMS at 60 Hz frequency. A signal 38 is generated at the output of transformer 34 and, while is the same frequency at the input signal, it has a peak value substantially less, preferably approximately 10 volts peak, or 6.3 volts RMS. This low voltage signal is applied to the input of a conventional rectifier 40 producing the wave form 42. As seen in this Figure, the wave form 42 is a continuous train of positive pulses at the same amplitude as signal 38 but at twice the frequency, specifically, 120 Hz. This train of pulses is applied to the input of an amplifier 44 so that the signal can be supplied to the clock line at a sufficiently low impedance. The pulse train at the output of the amplifier is indicated at 46.

In a preferred embodiment, it is desirable to mark time intervals by periodically increasing the amplitude of one pulse relative to the others in train 46. For example, by doubling the amplitude of every twelfth pulse, an effective marker is provided at 1/10th of a second intervals. This may be easily accomplished by counting pulses with a suitable circuit 48 illustrated in FIG. 3, which is arranged to count to 12 and then begin again at zero. During the time interval (of approximately 0.008 seconds) between the beginning of the twelfth pulse and the beginning of the thirteenth pulse, the counter circuit has a voltage output which is applied to the gain control of an appropriate operational amplifier circuit in such a way to increase its gain. Previously cited amplifier 44 could be such an amplifier. This results in the inclusion of higher voltage pulses 46' in pulse train 46. Where this particular wave form comprises the previously recited clock signal, it will be understood that it is supplied via the clock line to all the encoders and to all the decoders in the overall system. However, it is also to be understood that this particular wave form is only one of many possible wave forms which might serve the properties of dividing the time into 1/10th of a second intervals and of including a sufficient number of pulses to provide a large number of possible distinguishable messages, as will be seen hereinafter.

When one of the encoders in the system is actuated, for example by manually closing a push button switch, the encoder will produce a characteristic sequence of pulses, as will be described hereinafter. In utilizing wave form 46 including reset pulses 46', the sequence of pulses produced by the encoder may consist of 11 pulses, one for each of the lower amplitude pulses (46) in the clock wave form, corresponding in time with the clock pulses. The code pulses appear on the command conductor (signal line 28) and may be either present or absent (either approximately 9 volts peak or 0 volts) and thus constitutes a binary coded message. The function of the encoder is to produce its particular, unique set of pulses, that is, its own unique coded signal. It will be understood by those skilled in the computer art that in the present case there are $2^{11}$ or 2,048 different sequences possible and, thus, the same number of different messages can be distinguished from one another. It should be evident also that the total message is transmitted in 1/10 of a second, the time interval between successive reset pulses 46'.

The coded message on the signal line is routed to all the decoders in the system which, as stated, are located at the various outlets. As will be discussed hereinafter, each decoder embodies circuitry such that it responds to only one of the various possible messages. This response may be a change in voltage which of course results in the previously recited switching signal to the connected switching device. As a result, if a decoder senses a particular message which it can respond to, its output voltage will change, thereby producing the appropriate switching signal. If the decoder does not sense a message to which it can respond, its output will not change. In either case, the twelfth pulse, that is, the pulse 46' which is of double amplitude, acts to reset all encoders and all decoders in the system so that another message can be transmitted.

It is to be understood that the pulse train 46 and the particular message format associated with this pulse train, as described, have been provided for exemplary purposes only. The message format might include either more or fewer pulses. Also, it is possible for the transmission medium to be fiber-optic cable instead of electrical wire. In any event, it is essential to use the system wide clock frequency for synchronizing the operation of the encoders and decoders.

There are a number of advantages in the system described so far. For example, the cost of installing the electrical wiring system will be less, because ⅓ to ½ of the heavy copper wiring and associated conduit can be omitted. The shielded-pair command cable is inexpensive and can be installed without protective conduit. Metal outlet boxes are not required for wall plates. Also, the electrician can wire all the outlets exactly alike, without being concerned with connecting a particular outlet to a particular switch. The cost of the electronic components, specifically the encoders and decoders is nominal and in fact decreasing as the technology advances, while the cost of copper, steel, and labor is steadily increasing.

Moreover, an electronic signalling system of the type described herein provides a greater flexibility for control. For example, as will be seen hereinafter, any wall plate can be put in control of any outlet, simply by installing corresponding encoders and decoders and the "programming" is readily changed to suit new requirements simply by replacing plug in components, without making any wiring changes. The command cable is the only wiring needed for electrical control in a building structure. It can handle the functions which presently require additional control wiring, such as door bells, anunciators, heating and air conditioning, including thermostats, fire and intrusion alarms, and the like. All of these are amenable to encoder-decoder operation. The command cable may be thought of as a communication network, extending throughout the residence or commercial structure, and carrying messages between any two points. This represents a further economy since specialized additional wiring for these other purposes is not required.

The electronic signaling method as described herein is particularly adapted for use with thyristor devices to control the power applied to the outlets. Thyristors are solid state devices which have the property of passing current during only a part of each cycle of the 60 Hz voltage wave form. The amount of time during which conduction takes place is readily controllable by electronic means, and the decoder output, as will be seen, can readily be adapted to accomplish this. Thus the thyristor device can advantageously replace an electromechanical relay as the power switching element. This has two beneficial results. First, the circuitry can be arranged to ensure that power is switched at or near the zero-crossing of the voltage wave form, thus avoiding a large surge of current such as occurs when full line voltage is applied to a cold lamp filament. Second, the exact time when conduction is initiated can be readily varied so that the connected appliance, such as a lamp, may be turned on gradually or may be turned on only partially, thereby providing a dimmer-switch type of operation.

Having prescribed system 10 and its manner of operation generally and the various advantages which may be attributed to this system, attention is now directed to some detailed aspects of this system. For example, in system 10, the aforedescribed command cable 26 may be made readily accessible at any point simply by connecting into the three conductors, specifically the command conductor or signal line 28, the clock line 30 and the shield 32. More specifically, a connection may be provided at every outlet utilizing a relatively small auxiliary connector which is separate from the power line. FIG. 4 illustrates how this may be accomplished. As seen in this figure, the pair of outlets 14, in the form of receptacles, are provided at a particular location in the wall of the building structure and surrounded by an outlet cover plate 50 suitably connected to the wall. The outlets are of course connected to the power line 16 through previously recited switching devices 18. However, in accordance with the present invention, a separate auxiliary connector 52 may be provided in the same plate. This auxiliary connector is connected to the three conductors making up cable 28, specifically the signal line, clock line and shield, which of course are also connected to the decoder or decoders at the outlets, as illustrated.

The auxiliary connector 52 would include a conventional plug-in type arrangement (for example one similar to the receptacles but smaller) for connecting an auxiliary decoder or for that matter an auxiliary encoder into electrical communication with the command cable. Of course, the decoder or encoder would include a cooperating, complementary plug-in arrangement (for example a plug). In this way, coded command signals can flow both into and out of this connection. Thus, a control station identical in function to a wall plate may be connected to an outlet to control either that outlet or any other outlet in the system. Such an arrangement would be useful, for example, in allowing a lamp to be controlled from two locations, either locally, at the lamp, or remotely, from a wall plate. It would also be useful in remote control of television or radio. In this application, several decoders would be installed in the apparatus to be controlled, and a corresponding number of encoders would be provided in a remote control box conveniently located in the room and connected to a nearby outlet via an extension of the command cable. Several commands can thus be sent to the appliance via the command cable, and without using a special purpose remote control device which generally employs a high frequency sound linkage or a low power radio linkage.

Not only can auxiliary components be provided at the outlets in the system 10, but as illustrated in FIG. 5, an auxiliary encoder having its own distinct code can be readily installed at an existing control station. These auxiliary control stations do not require metal boxes behind the wall surface and they may be readily attached to the surface by any convenient means such as adhesive or small screws. As seen in FIG. 5, the existing control station is in the form of an existing wall plate 54 which is fixed to the wall and which surrounds appropriate ON and OFF buttons provided for actuating its associated encoder. This wall plate may be designed to include a plug-in arrangement 56 appropriately connected into the three conductors of command cable 26. An auxiliary unit 58 including its own encoder may also include its own plug in arrangment 56 in which case connecting pins 60 would be provided or interconnecting the two plug in arrangements for interconnecting the auxiliary encoder with the command cable. However, the auxiliary unit may include a plug in arrangement which is complementary to plug in arrangement 56 to eliminate separate pins 60. Both sides of the auxiliary unit may include an appropriate plug-in arrangement and appropriate circuitry for connecting a plurality of units in tandem.

In addition to or in lieu of the foregoing, decoders 22 may be designed for plug in installation. For example, FIG. 6 illustrates an overall arrangement 62 which includes a circuit card 64 for insertion into a printed circuit connector to be discussed below. A decoder 22 and switching device 18 along with the appropriate interconnecting leads form an intergrated circuit which is mounted on card 64. This entire card can be readily inserted into an appropriately provided printed circuit connector 66 which may be provided at an outlet 14. Upon insertion of the circuit card into the printed circuit connector, the decoder is automatically connected into command cable 26, as illustrated. Of course, the two would include appropriate cooperating plug-in arrangements. As a result, changing the "programming" of the wiring system for controlling the outlets is simply a matter of removing one circuit card and inserting another.

With regard to the circuit card and intergrated circuit just described, it may be convenient to route the 60 Hz power across this card, from one connection to another with the switching device, specifically the thyristor, in its path, as illustrated in FIG. 6. In this way, if the card is withdrawn, the outlet is automatically disabled. If the outlet is not to be controlled by an encoder, a dummy card which is illustrated in FIG. 7 may be inserted. This dummy card which is generally designated at 68 may be identical to circuit card 64. However, the dummy card does not include previously recited decoder 22, thyristor 18 and the leads associated therewith. Rather, this card carries only a link or jumper between the power carrying conductors for closing the power circuit at the outlet. This link or jumper is indicated at 70. With either of these cards, a fuse indicated at 72 may be included in the power current path to limit the current that can be drawn from the outlet. This maximum current would normally be somewhat less than the value which would trip the circuit breaker for that branch of the power circuit. As a result, a fault in a connected appliance in a particular outlet would affect only that outlet and would not shut down the entire system or even a branch of the system. Once the faulty appliance is removed, the affected outlet could be readily placed back into operation merely by withdrawing the card and replacing the fusible link.

The encoders 20 may also comprise integrated circuits. As illustrated in FIG. 8, an encoder circuit may be conveniently provided in a plug in module indicated generally at 76. This module would include three connectors 78 which are provided for connecting the encoder into the three conductors comprising command cable 26. In FIG. 8, one encoder is shown in place within a relatively thin wall-plate 80. This plate accomodates a second encoder module which is illustrated in a disengaged position. As illustrated, the module may merely snap into the cooperating opening in the plate where the connectors 78 automatically engage complimentary connectors 82 for automatically connecting the encoder into the command cable. In this way, the wall-plate does not have to be removed when changing encoders. In this regard, the encoder circuitry may be actuated by momentary electrical contact, such as a spring loaded push button. However, an alternative method of actuation utilizes the touch-plate principle, whereby the circuitry is actuated by simply touching the surface of an appropriately located push button with the finger, without any make-break contact. The presence of a finger near the surface increases the capacity between two conductors near the surface, and this change in capacity can be detected by suitable circuitry in the encoder. Such touch-plate controls are frequently employed for elevator call buttons and, with this feature, there are no mechanical contacts whatever in the entire system.

Having described various physical configurations for the encoder and decoder and ways to interconnect these components into the command cable, attention is redirected to FIG. 1 in conjunction with FIG. 3. As stated previously with regard to these figures, a typical wiring installation in a building structure, for example in a house, will include a standard voltage source and a clock-signal generator which either provides a clock-signal in and by itself or utilizes the voltage source to provide such a signal. In either case, there will be circuitry which provides the aforedescribed clock signal at its output. In accordance with another aspect of the present invention, this signal may be used for powering each of the encoders and decoders, especially if these circuits are the type that use very little power. In particular, circuit technology known as "complimentary MOS" is appropriate for this purpose.

As illustrated in FIG. 9, by connecting a diode 84 and capacitor 86 between the clock line 30 and ground, a charge may be accumulated during the high amplitude set and reset pulses 46' on the clock line (see FIG. 3) sufficient to operate the encoder or decoder during the 1/10th of a second interval between these pulses. In this regard, one with ordinary skill in the art could readily select the proper value for capacitor 86 and could interconnect the capacitor across the circuitry of the encoder or decoder to power the latter during the appropriate intervals.

As will be seen below, the encoder 20 constructed in accordance with the present invention functions by allowing certain selected pulses from the clock signal, that is, from the group of 11 pulses 46 between the reset high amplitude pulses 46', to pass from the clock line to the signal (command) line. As a result, the signal line is maintained at zero volts continuously unless an encoder is actuated. Following manual actuation, the next high amplitude pulse 46' in the clock line initiates an encoding sequence by which certain ones of the 11 low amplitude pulses are gated across to the signal line from the clock line. Each encoder makes a different selection from the 11 pulses, and this selection is the code sequence which represents that particular encoder. By designating the transmitted pulses by "one" and the blocked pulses by "zero," a typical code sequence might be 00101110010. As noted previously, there are 2,048 possible sequences with 11 pulses to choose from.

As will be seen below, it is advantageous to use the encoder for gating pulses between the clock line and signal line, rather than employing the encoder to generate its own pulses and drive the signal line with its own power. The gating operation requires very little power and, hence, the encoder can operate on minimum power. The clock signal generator already has plenty of power to supply the capacity required by the signal line as well as the load presented by the decoders at the outlets. Using the least possible power in the encoder makes it practical to supply that power via the clock line, as previously stated. A second advantage is that the wave shape of the clock pulses is relatively low in high frequency components, and hence less likely to cause noise problems in the system.

A circuit which may serve as an encoder of the type just described is shown in block diagram in FIG. 10. As will be described, the clock line 30 is connected to the signal line 28 through an overall gate arrangement 92 within the encoder, which also includes circuitry for determining which pulses will be passed from the clock line to the signal line. This circuit arrangement includes a conventional counter circuit 86 having 11 outputs, each of which is normally at zero volts, but each of which goes positive during one pulse on the clock line. Thus, each positive output represents a number from 1 to 11. The counter is reset to its zero state by each high amplitude reset pulse. Each of the counter outputs is routed to a two-input AND-gate 88. While there are 11 such AND-gates, only one has been shown. When a particular output is positive, the corresponding gate output will be positive, provided that the other gate input is connected to positive voltage. However, if the other gate input is connected to zero voltage, there is no gate output. It is clear that during a cycle of 12 pulses on the clock line, including one high amplitude pulse, each of the AND-gates will produce either a plus or a zero output, during its corresponding clock pulse (The period of approximately 0.00833 seconds in the present case). All 11 of the gate outputs are combined by an OR-gate 90, whose output is therefore a succession of pulses, either positive or zero, each of which respectively opens or closes a conventional gate circuit 92 having its output connected into the signal line 28. The particular code sequence produced by the encoder depends on which of the AND-gates is connected to plus voltage and which is connected to zero voltage.

The encoder circuitry just described also includes a diode 84 and capacitor 86 for providing DC voltage to operate the circuit components, as previously described in FIG. 9. Also, there are two comparators 98 and 100 which are provided for generating pulses with sharply rising wave shapes, as illustrated. These sharp signals are required by the counter. One comparator produces a sharp pulse on every one of the 12 clock line pulses, and these are the pulses that are counted. The other comparator produces a sharp pulse only on the high amplitude reset pulse and it is this sharp pulse which is employed for resetting the counter to insure that it always starts on the first pulse of the group of 11 pulses.

Some details of the circuitry just described have been omitted for purposes of clarity. For example, the method of manually starting the encoder is not shown because there are a number of ways of doing this. Also, details of the counter, comparators, AND-gates, OR-gates, and the pulse gating circuit have not been specified. However, these components are readily available in the art and persons with ordinary skill can readily provide such circuitry which may take on a variety of forms.

Circuitry suitable for use as a decoder is shown in FIG. 11. Like the encoder, the decoder circuitry utilizes two comparators, 102 and 104, one for shaping the clock line pulses 46 and the other for generating reshaped reset pulses from reset pulses 46'. Following a reset pulse, a shift register 106 stores 11 bits of data, each corresponding to the state of the signal line during one pulse on the clock line. Thus, after 11 clock pulses, the shift register will hold a set of 11 "ones" and "zeros". Each of the 11 shift register outputs is provided with an inverter 108, the function of which is to produce the opposite of that output, i.e., zero for plus and plus for zero on the respective output. While only one such inverter has been shown it should be apparent that there are 11 in all. Therefore, there are 11 pairs of signals available from the shift register, and each such pair (shift register output and its inverse) will consist of one zero voltage and one positive voltage. From these 22 available signals, a set of 11 may be chosen such that for a particular group of stored bits in the shift register all are zero at the same time.

Choosing a particular set of shift register outputs and inverted outputs defines the particular code group to which the decoder will respond. The 11 outputs are routed to an OR-gate 110, which will produce its output only when all the inputs are zero simultaneously (or, alternatively, when all inputs are positive simultaneously). One additional input is required by the OR-gate, which input is furnished by the comparator 104 from the high amplitude pulse 46'. In this way, the decoder cannot function prematurely. It can produce an output only after all 11 data bits are in place in the shift register. After a short time delay, for example one or two milliseconds, utilizing a conventional time delay circuit 112, the shift register is reset to its zero state. The entire process described requires 12 clock pulse periods of 0.00833 seconds each, or 0.1 seconds. The OR-gate output triggers a flip flop 114 which, in turn, controls previously described thyristor 18 for supplying power line 16 to an associated outlet 14. The flip flop is, in effect, a memory device which takes on the state required by the latest decoded command and holds that state. The complete decoder may comprise two sets of circuitry of the type just described, one for ON commands and one for OFF commands, delivering their respective outputs to the single flip flop 114.

The description just provided has been somewhat simplified for purposes of clarity in order to illustrate its principle of operation without unnecessary complication. Thus, for example, it will be necessary to cut off clock pulses from the shift register after the 11th pulse, so that the data bits will not shift out of place after 11 of them have been accumulated. This requires a counting circuit (not shown) to keep track of the number of pulses since the most recent high amplitude clock pulse. Also, the thyristor must receive a firing pulse during each and every one of the half cycles of line voltage. Such a series of firing pulses may readily be derived from the comparator which precedes the shift register. These functions, as well as those shown in FIG. 11, can readily be implemented in a variety of ways by those skilled in the electronics art. By using complementary-MOS solid state circuitry, the power requirements of the decoder may be kept very small, so that, like the encoder it can be powered by the clock pulses on the clock line. In this regard, the decoder includes a combination diode-capacitor of the type described in FIG. 9.

As stated previously, the clock pulses utilized in system 10, in its preferred embodiment, are synchronous with the wave form on the 60 Hz power line. As a result, these clock pulses may be used to determine the timing of current switching to the outlets by means of the thyristors. As a result, the exact instant of switching may be made to coincide with the time when the power voltage is at, or close to, zero during its sinusoidal voltage wave form. In FIG. 12, an arrangement 116 for accomplishing this is illustrated. As seen therein, an AND-gate 118 has its output connected to the triggering terminal of the thyristor (not shown). However, the firing pulse at the output of the AND-gate is dependent upon two inputs. First, the output of previously described flip flop 114 connected to one input of the AND-gate must be positive. It may recalled from FIG. 11, that flip flop 114 is the ultimate output of decoder 22, specifically the ON decoder and the OFF decoder illustrated in FIG. 11. Accordingly, if there is to be a positive input from flip flop 114, the ON encoder must be actuated. The other input of the AND-gate is the differentiated output from previously recited comparator 102 which advances the data in shift register 106. This second input to the gate consists of short pulses which occur very close to the zero-crossing of the power-line voltage. It is advantageous to fire the thyristor at this time, rather than when the power line voltage is at or near its peak value, because the latter operation puts full line power across the load. As stated previously, lamp filaments are severely stressed by such treatment.

A further advantage may be achieved by utilizing the timing information carried by the clock line. As is well known, thyristors can control the amount of current supplied to a load by holding back current flow for a part of each cycle of the line voltage. FIG. 13 illustrates the sinusoidal current which might flow through a load. The thyristor device is connected ahead of the outlet terminals, current may be held back until a firing pulse is delivered to the thyristor. This current flow is shown as the shaded portion of the wave form. Obviously, current may be advanced from zero to full value by adjusting the timing of the firing pulses. This is the function performed by so-called "dimmer switches" that are sometimes installed (at extra cost) in place of ordinary mechanical switches for line control. The system described herein can provide this function at any outlet, at little or no additional cost.

Since thyristor control of the current is already implicit in the system's design, it is necessary only to arrange the decoder circuitry to control the timing of firing pulses. One method of doing this is to employ several repeated commands from wall plate to outlet to apply full power. Each command functions to advance the firing pulse toward the beginning of a line voltage half cycle. If, for example, 10 successive commands each advance the firing pulse by 10% of the 0.00833 second cycle time, then full power will be applied over a period of 1 second. If only, say, three commands are sent from wall plate to decoder, then power will remain at a partial level. Turn off, or power reduction, at the outlet can be similarly implemented, so that the operator can adjust the brightness of lamps or the power of other appliances to suit his purpose by touching the ON and OFF push buttons for a time period that secures the desired results.

The circuit generally designated at 122 in FIG. 14 may be utilized to adjust the power at an outlet 14 by controlling associated decoders by mean of associated encoders. As illustrated in this figure, the previously described ON and OFF decoders 22 comprise part of circuit 122. These decoders deliver their respective outputs to an up-down counter 124 rather than previously described flip flop 114 illustrated in FIG. 11. The counter is a memory device, which keeps track of the total number of ON commands plus the total number of OFF commands. Its circuitry is arranged so as not to count above 10 or below zero. The counter has 10 output terminals, and only one at a time can be at a positive voltage. Each output thus represents a number from 1 to 10. The 10 outputs are connected by resistors R1, R2 and so on to a common bus 126 which, in turn, is connected to ground through a single resistor R11. Resistors R1 through R10 have different values, so that each output delivers a different amount of current to R11. By the suitable choice of values R1 through R10, the voltage across R11 may be made to increase (or decrease) stepwise as the counter moves between 1 and 10. This circuit may be recognized by persons with ordinary skill in the electronics art as a simple form of a digital-to-analog convertor. Other circuits serving the same purpose may be readily devised. The voltage across R11 may vary, according to the choice of resistance values, from zero to, for example, 0.5 volts, and this voltage may serve as one of two inputs to a comparator 128. The other input of comparator 128 may be taken from the decoder circuitry, specifically from comparator 102 where a "square wave" is available. R-C integrating circuit 130 forms the square wave into a gradually increasing ramp voltage. By suitable choice of component values, this ramp voltage may be arranged to reach 0.5 volts in approximately 0.00833 seconds. When a coded command sequence has been transmitted several times, the stepwise DC voltage will assume some value between zero and 0.5 volts. During each half-cycle of the power line voltage, the ramp voltage will rise steadily to 0.5 volts. At some time during the 0.00833 second interval, the two voltages will be equal, and the comparator will deliver a sharp output pulse which may serve to initiate conduction of the thyristor. The timing of this pulse obviously depends on the total number accumulated by the counter, i.e., the number of ON commands less OFF commands. The operator need only touch the appropriate encoder push button associated with the ON decoder or OFF decoder continuously until the brightness of the lamp is suitable.

Certain building code regulations may require that mechanical separation of contacts must be employed to break circuits handling 110 volt power. To comply with such regulations, an electromechanical relay may be employed in tandem with, or in place of, a thyristor element. This is illustrated in FIG. 15a where a part of previously described arrangement 116 (FIG. 12) is shown along with a thyristor 18 and an electromechanical relay generally designated at 131. As seen in this figure, the decoder 22 is seen to operate a thyristor as has been previously described; but in this case, the thyristor is a small capacity unit which has the function only of operating the relay 131, by supplying the line power to the relay coil 133. The relay may supply power, in turn, to the connected load through a relay contact 135. Alternatively, as illustrated in FIG. 15b, the relay may supply power to a second thyristor 18' whose capacity is suited to the connected load, and whose current flow is under the control of the decoder in the previously described manner. The second arrangement maintains the advantages already cited which result from thyristor control. The low-power consumption of the decoder is preserved by using line power to operate the relay coil, with the decoder supplying only switching impulses to the thyristor. A suitable relay for the purpose might be mounted on the plug-in circuit board that mounts the decoder circuitry, illustrated in FIG. 6.

In the system which has been disclosed thus far, there is a possibility that two encoders will be actuated simultaneously. Such an event would be uncommon. The signal line is quiescent most of the time in a typical system, probably in excess of 99% of the total time. When an encoder is actuated, the signal line is activated for 0.1 second. (If the gradual turn on mode described above, is employed, a series of commands from a single encoder might occupy 1 or 2 seconds). It is improbable, but certainly possible, that a second encoder might be actuated during the time that the signal line is busy. This would result in a code group which does not represent either encoder, and such a command would be capable of turning on (or off) a decoder, provided that there is one in the system which corresponds to the garbled command. This, again, is improbable since, as noted above, there are some 2,000 possible commands (utilizing 11 bits of data) and a typical system such as a residence might use 50 or fewer of them. Thus, a random code group would most likely have no effect at all. The worst case is that an unintended lamp or other appliance would be inadvertently turned on or off. The two operators who are competing for time on the system and who presumably are unknown to each other (i.e., they may be in separate rooms), would merely try again and almost certainly would be successful in their second attempt.

In view of the double improbability of malfunction due to a time conflict and the relatively innocuous consequences of such a malfunction, it is perhaps unnecessary to guard against conflicting commands. However, it is possible to reduce their probability to the vanishing point with the addition of some simple circuitry to the encoders. One method of doing this is to arrange for manual encoder operation to generate a special signal, distinctive from any code group, which has the effect of temporarily disabling all other encoders. This signal may occupy a very short time interval, on the order of microseconds, following which the first encoder to operate has a clear line for 1 or 2 seconds, for example. The "disable" signal will occur at the instant of a first switch contact, and all other encoders will be disabled within a few micro seconds, so that for all practical purposes it is impossible to generate a conflict.

The means for actuating an encoder was omitted from the description of the encoder circuitry in FIG. 10 in order to simplify the discussion. However, a practical method is illustrated in FIG. 16. As seen in this figure, part of the encoder circuitry from FIG. 10, specifically counter 86 and comparators 98 and 100 are shown. However, for purposes of clarity, the inputs to the comparators and the outputs from the counter have not been shown in FIG. 16 but may be readily seen in FIG. 10.

As illustrated in FIG. 16, one of the comparators, specifically comparator 98, shapes each clock pulse to a square wave with very short rise time. The other comparator, specifically comparator 100, does the same for the high amplitude pulses which occur each 1/10th of a second. These latter pulses pass through a RC network 130 which shortens them to a duration of a few microseconds. This short, positive pulse is applied to a flip flop 132 and to the counter 86 to reset both the flip flop and the counter. Thus, both of these components are kept in their reset state, and returned to that state (within 1/10th of a second) if they depart from it. If the manual switch 134 is closed, the output from comparator 100 is applied to the set input of the flip flop and this signal persists after the reset pulse has disappeared. The flip flop is now left in its set state, which causes the AND-gate 136 to be opened and clock pulses from the comparator 98 to reach counter 86. Thus, the encoding process commences when the manual switch is closed at the time of a high amplitude pulse (46') on the clock line. It is the high amplitude pulse which determines the timing. The manual switch may close at any time, but to be effective, it must be held closed past the leading edge of the comparator pulse. After 1/10th of a second, the encoding process is complete and the reset pulse cuts off clock pulses by resetting the counter and flip flop. If the manual switch is held closed, another command would be transmitted.

The encoder actuating circuitry just described does not include a "disable" signal at the instant the manual switch is closed. However, the circuitry can be easily modified to include such a signal. This is illustrated in FIG. 17 where a one-shot circuit 138 is provided with an input from signal line 28 through a differentiating network 140. Pulses with a fast rise time appearing on signal line 28 can trigger circuit 138 but the normal coded command signals cannot get through the RC network because of their relatively slow rise time. One-shot circuit 138 normally has its $\bar{Q}$ output positive so that a positive voltage is available to the manual switch 134. Operating this switch sets a flip flop 142 whose output is coupled to the signal line by way of the capacitor 144 and a resistance 146 to ground so that a very short positive pulse is delivered to the signal line at the instant of manual switch closure. This signal has the effect of triggering the one shot into its Q-positive state which, as illustrated, is an unconnected output, so that the manual switch becomes ineffective. The signal line 28 carries this "disable" signal to all other encoders for the purpose temporarily disabling them. The first activated encoder that is, the one illustrated in FIG. 17, already has a triggered flip flop as a result of the initial closure of switch 134 and hence is ready to produce the coded message at the next reset pulse 46'. This is accomplished by utilizing AND-gate 148 which has one input connected to the Q output of flip flop 142 and its other input to the output of previously recited comparator 100. Accordingly, the AND-gate applies the pulse to previously recited flip flop 132 when the switch 134 is closed and when the high amplitude pulse 46' appears at the comparator 100. Flip flop 132 controls the flow of clock pulses through AND-gate 136, as previously described. However, an alternative method of resetting is shown, in which the reset pulse from the two flip flops comes when the counter has accepted 11 input pulses, as illustrated in FIG. 17.

Obviously, the disabling method just described would be equally effective if a separate conductor were employed in the command cable for the purpose of carrying the disable signal. If this method were used, the command cable would then be a three conductor-shield cable, and there would be some additional cost (although slight) for material. A two-wire plus shield is the preferred embodiment, since the disable signal can be easily distinguished from coded commands by its rapid rise time (a microsecond or two) as opposed to approximately 4 milliseconds for clock pulses.

What is claimed is:

1. In a building structure, an electrical power distribution system for controlling the supply of electrical power to a plurality of outlets located at selected locations in the walls and ceiling of said structure, said system comprising:
  (a) a source of AC power of predetermined frequency and amplitude producing a 110 volt AC power signal at 60 Hz;
  (b) power conductors extending from said source of electrical power along specific power paths through the walls and ceiling of said structure to said selected locations for providing electrical power to said outlets;
  (c) a switching device disposed at each of said locations and responsive to a predetermined switching signal for connecting the power conductor at its location to an associated outlet for applying said electrical power thereto;
  (d) a plurality of control stations disposed at selected locations in the walls of said building structure remote from said outlets and away from said power paths, whereby said control stations are free of any of said power conductors;
  (e) encoding means located at each of said control stations for generating a code signal when actuated, each of the generated code signals being different from the others;
  (f) decoding means located at each of said outlets and connected to an associated switching device, each of said decoding means being responsive to a corresponding code signal for generating said predetermined switching signal to its connected switching device;
  (g) means for producing a continuous pulsating clock signal of predetermined frequency and amplitude for synchronizing and coordinating the operation of said encoding means and decoding means, said clock signal producing means being connected to said source and including means for transforming down and rectifying said power signal to produce a rectified, low voltage pulsating clock signal having the same frequency as said power signal or a multiple thereof, said clock signal including successive pulse trains, each of which includes a fixed number of pulses of equal amplitude, said pulse trains being provided for synchronizing said coded signals and being separated by single pulses which are of different amplitude than said fixed pulses and which are adapted to initiate said coded signals; and
  (h) a common control cable separate from said power conductors and extending through the walls and ceiling of said structure between said control stations and said outlets so as to define an overall control path different than any of said power paths, said cable including
    (i) a command conductor connected between all of said encoding and decoding means for carrying said code signals from each of said encoding means to all of said decoding means, and
    (ii) a clock-signal conductor connected to said clock signal producing means and all of said encoding and decoding means for carrying said clock signal to each of said encoding means and said decoding means in synchronism with said coded signals.

2. A system according to claim 1 wherein each of said encoding means and decoding means includes its own power supply means for operation thereof, each of said power supply means being connected with said clock signal producing means by said clock conductor and including means for accumulating an electrical charge during and as a result of said higher amplitude pulses, said accumulated charges being used to power said encoding means and decoding means during the period between said higher amplitude pulses.

3. A system according to claim 1 wherein each of said coded signals generated by each encoding means consists of a series of pulses corresponding in time to predetermined ones of said train pulses, said encoding means including gate means connected between said clock conductor and said command conductor for passing said predetermined ones of said train pulses from said clock signal carried on said clock conductor to said command conductor for producing said coded signal.

4. A system according to claim 2 including auxiliary connector means located at least at some of said wall outlets, each of said connector means being interconnected with said clock conductor and control conductor for providing electrical access to said conductors from outside said wall, whereby auxiliary encoding means and decoding means can be readily connected into the system at said preselected outlets.

5. A system according to claim 1 wherein each of said control stations includes a housing plate fixed to the wall of said structure and supporting an associated encoding means, said encoding means including means accessable outside said housing plate for actuating said encoding means.

6. A system according to claim 5 wherein each of said housing plates includes a plug-in type auxiliary connecting means interconnected with said command and control conductors for providing electrical access to said conductors outside said housing plate, said system including an auxiliary housing plate, an auxiliary encoding means supported by said plate and including actuating means accessable outside the plate, and a plug-in type connecting means adapted for plug-in connection to any of said auxiliary connecting means for interconnection with said command and control conductors.

7. A system according to claim 5 wherein said actuating means includes circuit means for actuating said encoding means in response to an operator touching a predetermined area along said housing plate.

8. A system according to claim 1 wherein each of said decoding means and an associated switching device comprise parts of an integrated circuit mounted on a circuit card and wherein certain ones of said outlets includes a printed circuit connector means adapted for disengageable connection with any one of said circuit cards for automatically connecting the decoding means mounted on said card to said clock and control conductors and for automatically connecting the associated switching device in line with the associated power conductor whereby in the absence of said card said power conductor is open to its associated outlet.

9. A system according to claim 8 including fuse means mounted on each of said circuit cards and adapted for connection in line with an associated power conductor when said card is connected with said printed circuit connector.

10. A system according to claim 9 including blank circuit cards adapted for disengagable connection with said printed circuit connector means, each of said blank cards including only said fuse means mounted thereon, said fuse means being connected in line with an associated power conductor when said blank card is connected with said printed circuit connector.

11. A system according to claim 1 wherein each of said encoding means is an integrated circuit mounted on a circuit board and wherein certain ones of said control stations include integrated circuit connector means adapted for disengagable connection with any one of said circuit cards for automatically connecting said encoding means to said command and control conductors.

12. A system according to claim 1 wherein said source of power provides a 110 volt AC voltage at a 60 Hz frequency, wherein said switching devices are thyristors, and wherein each of at least some of said decoding means includes means for generating said switching signal for turning on its associated thyristor only when voltage across the thyristor is approximately zero volts.

13. A system according to claim 1 wherein said source of power provides a 110 volt AC voltage at a 60 Hz frequency, wherein at least one of said switching devices is a thyristor, wherein the decoding means associated with said one switching device includes means connected between its output and said thyristor for operating the thyristor in a way which controls the magnitude of power applied to the outlet from said source in a way which is dependent upon the length of time during which the associated encoding means is actuated.

14. A system according to claim 1 wherein any one of said encoding means includes means for temporarily preventing all the other encoding means from producing a coded signal when said one encoding means is initially actuated, whereby you minimize the possibility of inadvertently applying more than one coded signal along said command conductor, at a given time.

15. A system according to claim 1 wherein said switching device includes an electromechanical relay.

16. A system according to claim 15 wherein said switching device also includes a thyristor.

17. In a building structure, an electrical power distribution system for controlling the supply of electrical power to a plurality of outlets located at selected locations in the walls and ceiling of said structure, said system comprising:
(a) a source of AC power of predetermined frequency and amplitude;
(b) power conductors extending from said source of electrical power along specific power paths through the walls and ceiling of said structure to said selected locations for providing electrical power to said outlets;
(c) a switching device disposed at each of said locations and responsive to a predetermined switching signal for connecting the power conductor at its station location to an associated outlet for applying said electrical power thereto;
(d) a plurality of control stations disposed at selected locations in the walls of said building structure remote from said outlets and away from said power paths, whereby said control stations are free of any of said power conductors;
(e) encoding means located at each of said control stations for generating a code signal when actuated, each of the generated code signals being different from the others;
(f) decoding means located at each of said outlets and connected to an associated switching device, each of said decoding means being responsive to a corresponding code signal for generating said predetermined switching signal to its connected switching device;
(g) means for producing a continuous pulsating clock signal of predetermined frequency and amplitude for synchronizing and coordinating the operation of said encoding means and decoding means;
(h) a common control cable separate from said power conductors and extending through the walls and ceiling of said structure between said control station and said outlets so as to define an overall control path different than any of said power paths, said cable including:
(i) a command conductor connected between all of said encoding and decoding means for carrying said code signals from each of said encoding means to all of said decoding means, and
(ii) a clock-signal conductor connected to said clock signal producing means and all of said encoding and decoding means for carrying said clock signal to each of said encoding means and said decoding means in synchronism with said coded signals, and;
(iii) auxiliary connector means located at least at some of said wall outlets, each of said connector means being interconnected with said clock conductor and control conductor for providing electrical access to said conductors from outside said wall, whereby auxiliary encoding means and decoding means can be readily connected into the system at said preselected outlets.

18. In a building structure, an electrical power distribution system for controlling the supply of electrical power to a plurality of outlets located at selected locations in the walls and ceiling of said structure, said system comprising:
(a) a source of AC power of predetermined frequency and amplitude;

(b) power conductors extending from said source of electrical power along specific power paths through the walls and ceiling of said structure to said selected locations for providing electrical power through the walls and ceilings of said structure to said selected locations for providing electrical power to said outlets;

(c) a switching device disposed at each of, least at some of, said locations and responsive to a predetermined switching signal for connecting the power conductor at its station location to an associated outlet for applying said electrical power thereto;

(d) a plurality of control stations disposed at selected locations in the walls of said building structure remote from said outlets and away from said power paths, whereby said control stations are free of any of said power conductors;

(e) encoding means located at each of said control stations for generating a code signal when actuated, each of the generated code signals being different from the others;

(f) decoding means located at each of said outlets and connected to an associated switching device, each of said decoding means being responsive to a corresponding code signal for generating said predetermined switching signal to its connected switching device;

(g) means for producing a continuous pulsating clock signal of predetermined frequency and amplitude for synchronizing and coordinating the operation of said encoding means and decoding means;

(h) a common control cable separate from said power conductors and extending through the walls and ceiling of said structure and extending between said control stations and said outlets so as to defeine an overall control path different than any of said power paths, said cable including (i) a command conductor connected between all of said encoding and decoding means for carrying said code signals from each of said encoding means to all of said decoding means, and (ii) a clock-signal conductor connected to said clock signal producing means and all of said encoding and decoding means for carrying said clock signal to each of said encoding means and said decoding means in synchronism with said coded signals;

(iii) in each of said control stations includes a housing plate fixed to the wall of said structure and supporting an associated encoding means, said encoding means including means accessable outside said housing plate for actuating said encoding means and each of said housing plates includes a plug-in type auxiliary connecting means interconnected with said conductors outside said housing plate; and (j) an auxiliary housing plate, an auxiliary encoding means which is supported by said plate and which includes actuating means accessable outside the plate, and a plug-in type connecting means adapted for plug-in connection to any of said auxiliary connecting means for interconnection with said command and control conductors.

19. In a building structure, an electrical power distribution system for controlling the supply of electrical power to a plurality of outlets located at selected locations in the walls and ceiling of said structure, said system comprising:

(a) a source of 110 voltage AC power at a frequency of 60 Hz and a predetermined amplitude;

(b) power conductors extending from said source of electrical power along specific power paths through the walls and ceiling of said structure to said selected locations for providing electrical power through the walls and ceilings of said structure to said selected locations for providing electrical power to said outlets;

(c) a thyristor type switching device disposed at each of least at some of said locations and responsive to a predetermined switching signal for connecting the power conductor at its station location to an associated outlet for applying said electrical power thereto;

(d) a plurality of control stations disposed at selected locations in the walls of said building structure remote from said outlets and away from said power paths, whereby said control stations are free of any of said power conductors;

(e) encoding means located at each of said control stations for generating a code signal when actuated, each of the generated code signals being different from the others;

(f) decoding means located at each of said outlets and connected to an associated switching device, each of said decoding means being responsive to a corresponding code signal for generating said predetermined switching signal to its connected switching device at least some of said decoding means including means for generating said switching signal for turning on its associated thyristor only when the voltage across the thyristor is approximately zero volts;

(g) means for producing a continuous pulsating clock signal of predetermined frequency and amplitude for synchronizing and coordinating the operation of said encoding means and decoding means; and (h) a common control cable separate from said power conductors and extending through the walls and ceiling of said structure and extending between said control stations and said outlets so as to define an overall control path different than any of said power paths, said cable including (i) a command conductor connected between all of said encoding and decoding means for carrying said code signals from each of said encoding means to all of said decoding means, and (ii) a clock-signal conductor connected to said clock signal producing means and all of said encoding and decoding means for carrying said clock signal to each of said encoding means and said decoding means in synchronism with said coded signals.

20. In a building structure, an electrical power distribution system for controlling the supply of electrical power to a plurality of outlets located at selected locations in the walls and ceiling of said structure, said system comprising:

(a) a source of 110 voltage AC power at a frequency of 60 Hz and a predetermined amplitude;

(b) power conductors extending from said source of electrical power along specific power paths through the walls and ceiling of said structure to said selected locations for providing electrical power through the walls and ceiling of said structure to said selected locations for providing electrical power to said outlets;

(c) a plurality of switching device at least one of which is a thyristor, each of said switching devices being disposed at each of, at least some of, said locations and responsive to a predetermined switching signal for connecting the power conductor at its station location to an associated outlet for applying said electrical power thereto;
(d) a plurality of control stations disposed at selected locations in the walls of said building structure remote from said outlets and away from said power paths, whereby said control stations are free of any of said power conductors;
(e) encoding means located at each of said control stations for generating a code signal when actuated, each of the generated code signals being different from the others;
(f) decoding means located at each of said outlets and connected to an associated switching device, each of said decoding means being responsive to a corresponding code signal for generating said predetermined swtiching signal to its connected switching device; said decoding means associated with said one thyristor including means connected between its output and said thyristor for operating the thyristor in a way which controls the magnitude of power applied to the outlet from said source in a way which is dependent upon the length of time during which the associated encoding means is actuated;
(g) means for producing a continuous pulsating clock signal of predetermined frequency and amplitude for synchronizing and coordinating the operation of said encoding means and decoding means; and
(h) a common control cable separate from said power conductors and extending through the walls and ceiling of said structure and extending between said control stations and said outlets so as to define an overall control path different than any of said power paths, said cable including
(i) a command conductor connected between all of said encoding and decoding means for carrying said code signals from each of said encoding means to all of said decoding means, and
(ii) a clock-signal conductor connected to said clock signal producing means and all of said encoding and decoding means for carrying said clock signal to each of said encoding means and said decoding means in synchronism with said coded signals.

21. In a building structure, an electrical power distribution system for controlling the supply of electrical power distribution system for controlling the supply of electrical power to a plurality of outlets located at selected locations in the walls and ceiling of said structure, said system comprising:
(a) a source of AC power of predetermined frequency and amplitude;
(b) power conductors extending from said source of electrical power along specific power paths through the walls and ceiling of said structure to said selected locations for providing electrical power through the walls and ceiling of said structure to said selected locations for providing electrical power to said outlets;
(c) a switching device disposed at each of, at least some of, said locations and responsive to a predetermined switching signal for connecting the power conductor at its station location to an associated outlet for applying said electrical power thereto;
(d) a plurality of control stations disposed at selected locations in the walls of said building structure remote from said outlets and away from said power paths, whereby said control stations are free of any of said power conductors;
(e) encoding means located at each of said control stations for generating a code signal when actuated, each of the generated code signals being different from the others;
(f) decoding means located at each of said outlets and connected to an associated switching device, each of said decoding means being responsive to a corresponding code signal for generating said predetermined switching signal to its connected switching device;
(g) means for producing a continuous pulsating clock signal of predetermined frequency and amplitude for synchronizing and coordinating the operation of said encoding means and decoding means;
(h) a common control cable separate from said power conductors and extending through the walls and ceiling of said structure and extending between said control stations and said outlets so as to defeine an overall control path different than any of said power paths, said cable including
(i) a command conductor connected between all of said encoding and decoding means for carrying said code signals from each of said encoding means to all of said decoding means, and
(ii) a clock-signal conductor connected to said clock signal producing means and all of said encoding and decoding means for carrying said clock signal to each of said encoding means and said decoding means in synchronism with said coded signals; and
(iii) any one of said encoding means including means for temporarily preventing all the other encoding means from producing a coded signal when said one encording means is initially actuated, whereby you minimize the possibility of inadvertently applying more than one coded signal along said command conductor, at a given time.

22. A system according to claim 1 wherein said single pulses are of higher amplitude than said fixed pulses.

* * * * *